United States Patent [19]
Bommer et al.

[11] Patent Number: 5,647,088
[45] Date of Patent: Jul. 15, 1997

[54] WIPER WITH A WIND GUIDE DEVICE

[75] Inventors: Juergen Bommer, Tamm; Eduard Schill, Wiernsheim; Siegfried Waible, Flein, all of Germany

[73] Assignee: ITT Automotive Europe GmbH, Germany

[21] Appl. No.: 551,682

[22] Filed: Nov. 1, 1995

[30] Foreign Application Priority Data

Nov. 2, 1994 [DE] Germany ................ 44 39 109.9

[51] Int. Cl.$^6$ ................................................ B60S 1/38
[52] U.S. Cl. .................. 15/250.201; 15/250.46; 15/250.44
[58] Field of Search .................. 15/250.201, 250.46, 15/250.31, 250.44, 250.43, 250.361, 250.351

[56] References Cited

U.S. PATENT DOCUMENTS

| 4,953,251 | 9/1990 | Chow ...................... 15/250.46 |
| 5,206,969 | 5/1993 | Patterson et al. ................ 15/250.201 |
| 5,271,122 | 12/1993 | Roth et al. ...................... 15/250.46 |

FOREIGN PATENT DOCUMENTS

| 519826 | 12/1992 | European Pat. Off. ......... 15/250.201 |
| 0604322 | 6/1994 | European Pat. Off. . |
| 2679186 | 1/1993 | France ..................... 15/250.201 |
| 2842132 | 4/1980 | Germany . |
| 3424729 | 2/1986 | Germany . |
| 3904620 | 8/1990 | Germany . |
| 3923666 | 1/1991 | Germany . |
| 4105406 | 8/1992 | Germany . |
| 4116968 | 11/1992 | Germany ................. 15/250.201 |

Primary Examiner—Gary K. Graham
Attorney, Agent, or Firm—J. Gordon Lewis; Thomas N. Twomey

[57] ABSTRACT

A wiper which may be enhanced with a wind guide device in which the wiper has a support bracket system to accommodate and guide a wiper strip. Two subordinated brackets are positioned in a swivel bearing via a joint pin or joint bolt, resp., such that they may be rotated. The ends of the joint pin or the joint bolt, resp., project from the outside of the side walls of the primary bracket and form stop bars. The wind guide device is equipped with two mounting brackets which overreach the primary bracket in the range of the swivel bearing and may be attached reversibly on the stop bars while correspondingly designed recesses in the side walls of the mounting brackets accommodate the stop bars.

8 Claims, 5 Drawing Sheets

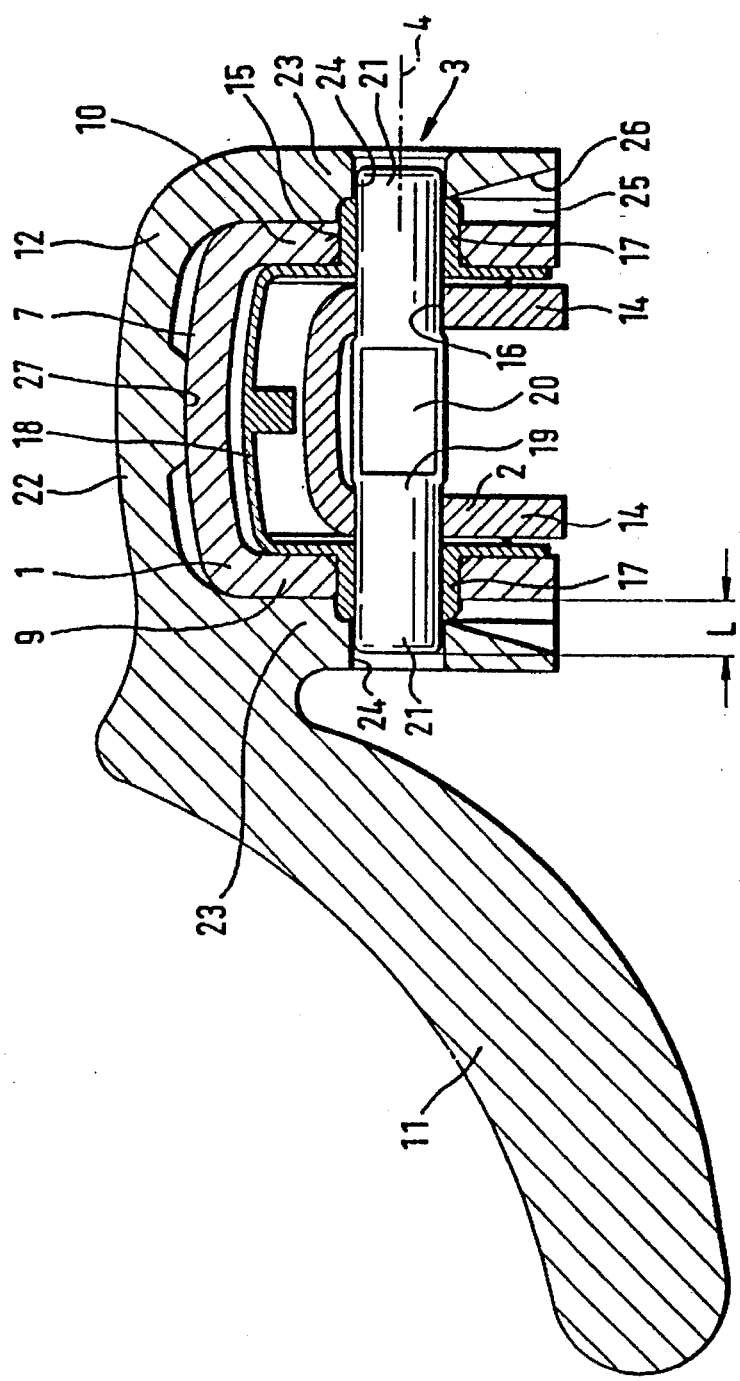

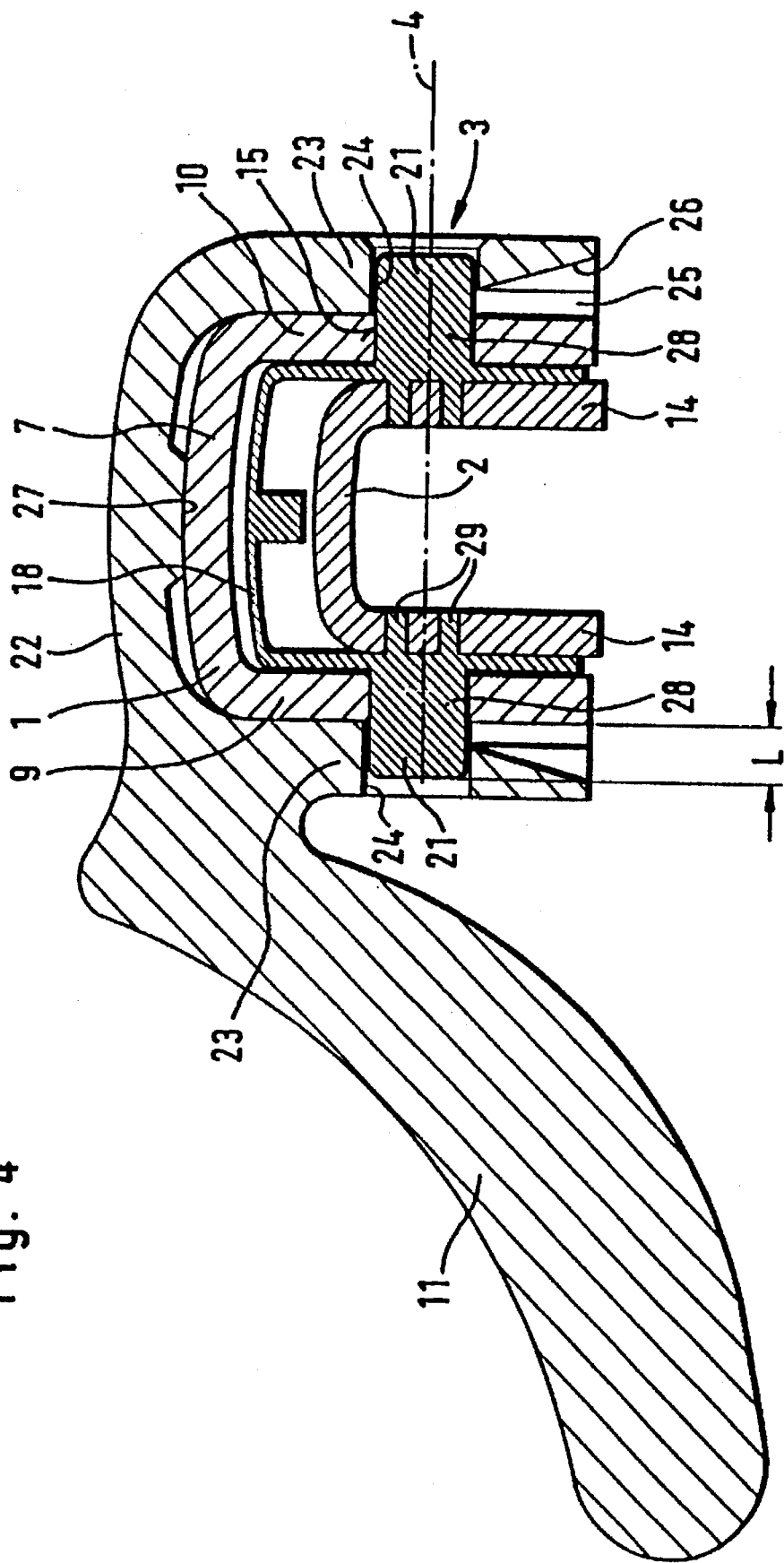

5,647,088

WIPER WITH A WIND GUIDE DEVICE

TECHNICAL FIELD

The invention relates generally to windshield wiper and more particularly relates windshield wiper which employ wind guidance devices.

BACKGROUND OF THE INVENTION

A wiper is known from DE 39 34 620 A1, which is equipped with a multi-part support bracket system to lead a wiper strip. On a primary bracket with essentially U-shaped cross-section and with side walls which are arranged parallel to each other, two subordinated brackets are positioned in a swivel bearing. In the range of the swivel bearing the primary bracket overreaches one subordinated bracket, whose cross-cut is also generally U-shaped, in such a way that in the side walls of the brackets openings accommodate a joint pin and are arranged coaxially to each other. The joint pin is connected (torsion-resistant) with the subordinated bracket and its opposite ends may be rotated and are positioned in a bearing sleeve, which, in turn, is torsion-resistant and positioned in the openings in the side walls of the primary bracket. The ends of the joint pins and/or the front sides of the bearing sleeves either terminate flush at the outside of the side walls of the primary bracket or project over the outside of the side walls by a negligible amount.

From EP 06 04 322 A1 another wiper is known with a support bracket system in which the subordinated brackets are positioned similarly on the primary bracket and they may be rotated. Instead of the joint pin a type of a joint rivet is provided to form the swivel bearing. This joint rivet has a cylindrical, pin-shaped part which reaches through the aligned bore holes in the side walls of the primary bracket and the subordinated bracket, followed by a surface to mount a wind guide device. The contact surface or shoulder of the mounting surface for the wind guide device abuts on the outside of a side wall of the primary bracket, while the opposite end of the joint rivet is riveted on the outside of the opposite side wall of the primary bracket. The mounting surface of the joint rivet projects from the side of the respective side wall of the primary bracket for a length, which corresponds at least almost to the length which corresponds to the distance between the outside of the two side walls of the primary bracket. In addition, the mounting surface of the joint rivet may be profiled differently in order to obtain a firm connection with the wind guide device while the firm connection between joint rivet and wind guide device is realized either before the creation of the swivel bearing or after the creation of the swivel bearing between primary bracket and subordinated brackets.

Beside the advantage that the higher press-on force caused by the wind guide device at a higher driving speed is transferred directly to the subordinated brackets at the pressure distribution points of the primary bracket, which means, at the swivel bearings, this known solution has disadvantages. For windshield wiping equipment to function properly it is generally suggested to replace the vehicle's wipers once or twice a year, because the wiping quality diminishes with time due to the wear on the wiper. This means that with each replacement of the wiper the wind guide device is also replaced although the latter is not subjected to wear and tear and would continue to function. This results in increased costs for the wipers to be replaced and it also causes unnecessary waste. An additional aspect is that a wind guide device may be disadvantageous during operation in winter. Snow and slush may collect under the wind guide device, or between the wind guide device and the actual wiper during wiping operation, which may limit the mobility of the wiper strip or the individual brackets of the support bracket system in relation to each other. Inevitably the wiping quality would be strongly impaired which also negatively affects the driving safety. On the other hand, the driving speeds under the circumstances described above are so low already that the wind guide device is barely able to achieve a useful increase of the press-on pressure of the wiper against the windshield to be wiped. However, because the wind guide device is firmly connected with the wiper, the entire wiper would have to be replaced again by a wiper without wind guide device in the case described above. In case the wiper with wind guide device to be replaced has not yet reached is wear and tear limit and could therefore be re-used, intermediary storage would be necessary. It is obvious that this would result in additional storage expenses.

It is an object of the invention to eliminate or reduce the disadvantages described above and to further develop a wiper of the above described type in such a way that the wiper may be used either with or without wind guide device and, depending on the prevailing conditions, good wiping quality is achieved.

This invention is based on the consideration that, at low cost, a connection may be obtained between a wiper and wind guide device, which is positioned at the side of the wiper, and which may be removed if necessary, by appropriately combining elements from the two described state of the art solutions and in addition to develop them further in a special manner. In the solution according to the invention, a wiper is used again in which two subordinated brackets are connected flexibly via a joint pin or joint bolt, resp., which are positioned in respective recesses or openings, resp., in the side walls and which are axially secured. The resulting swivel joints are defined by the fact that the opposite ends of the joint pin or the free ends of the joint bolt project by a certain amount over the outside of the side walls of the primary bracket, and thereby may be used in the most simple manner as a stop bar to create the connection between the primary bracket and the wind guide device. The axial length of the stop bars, which project from the outside of the side walls, is such that they are not larger or only negligibly so than the thickness of the side walls of respective mounting brackets which are provided on the wind guide device. These two mounting brackets are located spaced apart at the side of the wind guide device at a distance which corresponds to the distance of the two swivel bearings on the primary bracket of the wiper. Each mounting bracket has essentially a U-shaped cross-section with a back and two side walls projecting from the back. The mounting brackets are adjusted to the shape of the primary bracket such that they may reach over the primary bracket from the top in the range of the swivel bearings so that the insides of the side walls abut on the outside of the side walls of the primary bracket. At least one of the two side walls of the mounting bracket may be disengaged elastically in the direction diagonally to the primary bracket. The side walls contain aligned recesses whose shape is adjusted to the above described stop bars in such a way that they may accommodate these stop bars.

In order to complete the wiper with a pertaining wind guide device the mounting brackets of the wind guide device are now slipped over the primary bracket from the top in the most simple manner in the range of the swivel bearing. At least one of the two side walls of each mounting bracket will be disengaged elastically outward no later than when the stop bars are reached so that the side walls of the mounting bracket may get over the stop bars which are located diametrically opposite. The slip-on motion of the mounting brackets takes place until the recesses in the side walls of the mounting brackets slide over the stop bars and accommodate these. In this position the insides of the side walls of the rest brackets abut on the outside of the side walls of the primary bracket and ensure a secure and sufficiently firm connection between the wiper primary bracket and the wind guide device. The stability of the mounting position of the wind guide device on the primary bracket is highest when the under side of the back of the mounting bracket also rests on the back of the primary bracket. In a preferred embodiment, on the underside of the back of the mounting bracket a raised support surface is provided with which the back of the mounting bracket rests on the back of the primary bracket, and in the remaining area between the back of the mounting bracket and the back of the primary bracket a certain gap remains. Such a design permits improved elasticity of the mounting bracket on the one hand, and on the other hand, small production tolerances may be compensated for without impairing the stability of the connection between the mounting bracket and the primary bracket. When the removal of the wind guide device from the primary bracket of the wiper is required the side walls of the mounting bracket are spread so that the stop bars are released from the recesses in the side walls of the mounting bracket. Now the wind guide device may be removed from the primary bracket from the top.

A particularly simple embodiment of the mounting brackets of the wind guide device is provided where the recesses in the side walls of the mounting bracket are designed to be aligned cylindrical openings whose diameter is adjusted to the diameter of the stop bars. This design allows a particularly firm fit of the wind guide device on the primary bracket, particularly when the front sides of the stop bars terminate flush on the outside of the side walls of the mounting bracket, or even slightly surpass those.

Another embodiment provides that the recesses in the side walls of the mounting brackets are designed to be blind holes which extend from the inside into the side walls and, depending on the stop bars, are calculated to measure so much, that the inside of the side walls of the mounting brackets may abut on the outside of the side walls of the primary bracket.

It is of particular advantage if the recesses on the outside of the side walls of the mounting bracket are closed. This improves the aesthetic impression on the one hand, and on the other hand, it prevents humidity or dirt from entering the recess from the outside and from being deposited there.

It is already known that in order to improve the bearing behavior the swivel bearings between primary bracket and subordinated brackets should be designed such that additional bearing sleeves are inserted into the aligned openings in the side walls of the primary bracket, in which the joint pin or bearing bolt, resp., is placed. When using this technique the bearing sleeves may also project for the same or a shorter length as the ends of the joint pin or the bearing bolts, resp., on the outside of the side walls of the primary bracket. For such a case a design of the recesses in the side walls of the mounting bracket such that the recesses have a larger diameter, which is adjusted to the bearing sleeve, or they have a graded one.

Of particular advantage to mount the wind guide device on the primary bracket is a design according to which insert grooves extend on the insides of the side walls of the mounting bracket, from one recess to the under edge of the side wall. The width of the insert groove is adjusted to the diameter of the recess and when additional bearing sleeves are used in the swivel bearing, it may also be designed to be graded. The stop of the mounting bracket on the primary bracket may be improved additionally by providing the insert grooves with run-up bevels which expand to the under edge of the side wall.

It is already known that when the wind guide device is arranged on the side of the support bracket system, the use of a wiper primary bracket is advantageous whose back has recesses which extend essentially across the entire width between the side walls so that the back of the primary bracket essentially is formed by individual narrow bars which connect the two side walls. When such a primary bracket is used, additional mounting hooks are provided on the wind guide device between the two mounting brackets of the wind guide device. These hooks are essentially formed by two side walls whose distance from each other is adjusted to the thickness of the respective side wall of the primary bracket and which are connected to each other by a back. When the wind guide device is mounted on the primary bracket, these additional mounting hooks are simply slipped over the side wall of the primary bracket from the top in the area of an opening in the back of the primary bracket. Additional securing of these mounting hooks on the side wall is not required. The particular job of the mounting hooks consists of additional position fixation of the wind guide device diagonal to its longitudinal expansion on the primary bracket. This compensates for possible elastic deformations of the wind guide paddle by the pressure of the air stream during operation and a stable guidance of the wind guide device on the primary bracket is achieved. These additional mounting hooks are particularly advantageous for wipers of great length and for correspondingly long wind guide devices.

For the mounting brackets and/or the mounting hooks a design is provided whereby the side walls of the mounting brackets and/or the mounting hooks extend at least to the under edge of the side walls of the primary bracket when the wind guide device is mounted on the primary bracket.

Easy mounting and a secure fit of the wind guide device on the primary bracket of the wiper is achievable by a design to which the side walls of the mounting brackets and/or the mounting hooks, before the mounting of the wind guide device on the primary bracket, run at a flat angle to each other, starting at their back.

A wiper according to the invention is particularly cost effective if the wind guide device is manufactured including the mounting bracket and/or the mounting hooks as a single piece plastic part.

BRIEF DESCRIPTION OF THE DRAWINGS

FIG. 3 a cut through the swivel bearing along the line III—III in FIG. 2, enlarged (without wiper strip).

FIG. 4 another design example of the cut through the swivel bearing along the line III—III in FIG. 2, enlarged (without wiper strip).

FIG. 5 a section of a side wall of a mounting bracket according to FIG. 3 or FIG. 4 with a view of the inside of the side wall.

DETAILED DESCRIPTION OF THE PREFERRED EMBODIMENTS

Figure 1:
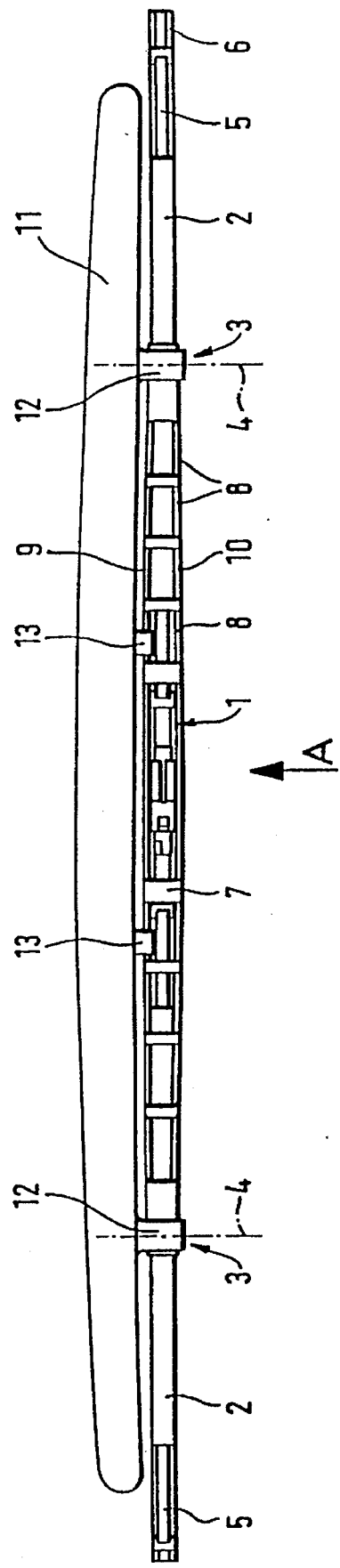
FIG. 1 A wiper enhanced with a wind guide device viewed from the top on the back of the primary bracket.
Figure 2:
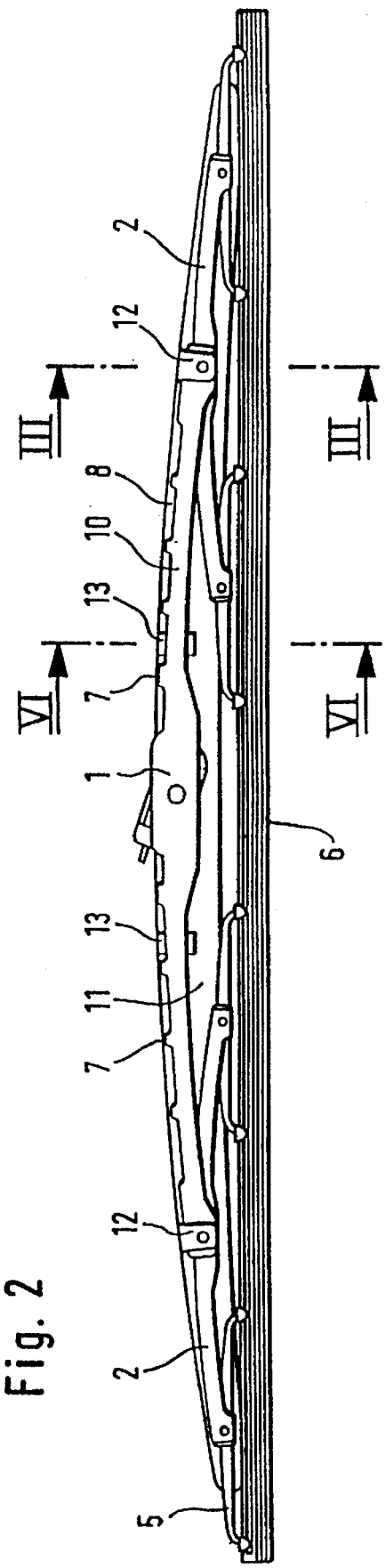
FIG. 2 a view of the wiper in FIG. 1 in viewing direction of the arrow A.

In FIGS. 1 and 2 a wiper is seen whose support bracket system has a primary bracket 1 and two subordinated brackets 2, where the subordinated brackets 2 are positioned in the swivel bearings 3 on the primary bracket 1, which are provided on the opposite ends of the primary bracket 1. In the swivel bearings 3 the primary bracket 1 overreaches the subordinated brackets 2 from the top, and the swivel axis 4 run diagonally to the primary bracket 1. In turn, each subordinated bracket 2 carries two claw brackets 5 which are attached with articulation and which should also be considered subordinated brackets. The claw brackets 5, in turn, hold and guide the elastic wiper strip 6. The fact that each subordinated bracket 2 has two claw brackets 5, indicates that the wiper is relatively long overall. In addition, it is apparent that the primary bracket 1 has a number of openings 8 in its back 7 which are provided to improve the flow conditions of the air streaming towards the wiper.

The openings 8 extend over the entire width between the side walls 9 and 10 of the primary bracket 1, while the side wall 9 represents the side wall located in the front, and the side wall 10 respectively represents the side wall located in the back, as seen in moving direction. The openings 8 are designed such that the back 7 of the primary bracket is actually formed by a number of bars which are spaced apart and which connect the two side walls 9 and 10 with each other, and these bars are designed to correspond in width in the range of the swivel bearing 3.

The wind guide device 11 with which the wiper is enhanced, is attached next to the support bracket system, which means at the side of the front side wall 9 of the primary bracket. In the range of the swivel bearing 3 the wind guide device 11 is attached with two mounting brackets 12, which overreach the primary bracket 1 in the range of the swivel bearing 3, while resting on the primary bracket 1. Because both the wiper and the wind guide device 11 are relatively long, an additional support of the wind guide device 11 on the primary bracket 1 is of advantage. For this reason the wind guide device 11 has two additional mounting hooks 13 in the space between the two mounting brackets 12, which are slipped over from the top on the front side wall 9 of the primary bracket in the area of an opening 8 in the back 7 of the primary bracket 1. Additional details are described in connection with FIGS. 3 through 8.

FIG. 3 shows that the cross-section of the primary bracket 1 is essentially designed U-shaped and has a back 7 from which the two side walls 9 and 10 extend in the direction of the windshield to be wiped, which corresponds to a downward direction in FIG. 3. The side walls 9 and 10 are arranged parallel. They overreach from the top the subordinated bracket 2, whose cross-section is also U-shaped and is equipped with the two side walls 14. In order to create the swivel bearing 3 one opening 15 is provided in each of the side walls 9 and 10 of the primary bracket 1, and in the side walls 14 of the subordinated bracket 2 one opening 16 is provided, with the openings 15 and 16 arranged flush with each other in regard to the swivel axis 4. It can also be seen that additional bearing sleeves 17 are provided in the openings 15 in the side walls 9 and 10 of the primary bracket which project somewhat over the outside of the side walls. The bearing sleeves 17 are designed to be produced in one piece with one component 18 and preferably made of plastic, with the component 18 being located in the space between primary bracket 1 and subordinated bracket 2 and keeping the bearing sleeves 17 torsion-resistant on the primary bracket 1.

A joint pin 19 which is essentially cylindrical reaches through the openings 15 and 16 and is located in the bearing sleeves such that it may be rotated. The joint pin 19 is secured against movement in axial direction in that it was equipped with a material deformation 20 after having been positioned in the area between the side walls 14 of the subordinated bracket 2, so that the joint pin 19 abuts in axial direction with a shoulder on the insides of the side walls 14 on the subordinated bracket 2. The cylindric ends of the joint pin 19 reach through the bearing sleeves 17 and project by a length L over the outside of the side walls 9 and 10 of the primary bracket 1. In the area of the length L the projecting ends of the joint pin 19, which project somewhat over the front sides of the bearing sleeves 17, serve as stop bars 21 for a reversible mounting of the wind guide device 11 on the primary bracket 1.

On the side of the wind guide device 11, a mounting bracket 12 is attached which also has an essentially U-shaped cross-section with a back 22 and with the side walls 23. The shape and the measurements of this mounting bracket 12 are selected to be such that the mounting bracket 12 may overreach the primary bracket 1 in the range of the swivel bearing 3 and the insides of its side walls 23 abut on the outside of the side walls 9 and 10 of the primary bracket 1. Recesses 24 are provided in the side walls 23 of the mounting bracket 12 to accommodate the stop bars 21. These recesses 24 are circular holes whose profiles are adjusted to the shape of the stop bars 21 including the end of the bearing sleeve 17 which is projecting from the side wall 9 or 10. The recesses 24 are also designed to be graded. To make the stop of the mounting brackets 2 in the range of the swivel bearing 3 on the primary bracket 1 easier, one inlet groove 25 extends inside the side walls 23 of the mounting bracket 12 from the recess 24 to the lower edge of the side wall 23. The inlet groove 25 is designed to be graded in its cross-section corresponding to the shape of the stop bars 1 in connection with the bearing sleeve 17, and in the range of the stop bars 21 a run-up bevel 26 extends to the lower edge of the side wall 23. The design of the recess 24 and of the inlet groove 25 is shown additionally in FIG. 5.

The stop connection between wind guide device 11 and primary bracket 1 shown in FIG. 3 is produced by slipping the two mounting brackets 12 of the wind guide device 11 over the primary bracket 1 of the wiper from the top in the range of a swivel bracket 3. When the lower edges of the side walls 23 of the mounting bracket 12 reach the bearing sleeves 17 projecting from the side walls 9 and 10 of the primary bracket 1, they are inserted into the inlet grooves 25. Next, the run-up bevels 26 reach the front edges of the joint pin 19 or the stop bars 21 and slide onto these. Because at least one of the two side walls 23 of the mounting bracket 23 may be elastically disengaged outward, the mounting bracket 12 may be pushed further over the primary bracket 1 by spreading the side walls 23 so far that the recesses 24 are flush with the stop bars 21. In this latter position the side walls 23 return into a position in which their insides abut on the outside of the side walls 9, 10. The recesses 24 now accommodate the stop bars 21 including the outer parts of the bearing sleeves 17 which results in a stop connection. In addition, a raised support surface 27, which is attached on the under side of the back 22 of the mounting bracket 12, rests on the upper side of the back 7 of the primary bracket 1, in this final position. With this additional support surface an even improved position fixation of the wind guide device 11 in relation to the primary bracket 1 is achieved.

In order to remove the wind guide device 11 from the primary bracket 1 when necessary, only the side walls 23 of the mounting bracket 12 have to be spread so far that the recesses 24 release the stop bars 21. In this position the wind guide device 11 is simply removed upward.

The details in the design example shown in FIG. 4 differ from the design example according to FIG. 3. Below primarily the differences between the two design examples are discussed so that identical functions and characteristics are not described again. A particularity of the design example according to FIG. 4 is that the stop bars 21 are now formed by the ends of the cylindrical joint bolt 28, which project by the length L from the outside of the side wall 9 and 10 of the primary bracket 1. The joint bolts 28 are attached to the component 18 and connected torsion-resistant by anchors 29 with the side walls 14 of the subordinated bracket 2. The special shape of the component 18, which is produced as a single piece and preferably of plastic material, as well as its location between primary bracket 1 and subordinated bracket 2 also ensure the axial securing of the joint bolts 28. Additional bearing sleeves are not available in this example, however, if needed, they may be provided in the side walls 9, 10 in the primary bracket 1 with respective expansion of the openings 15.

Figure 6:
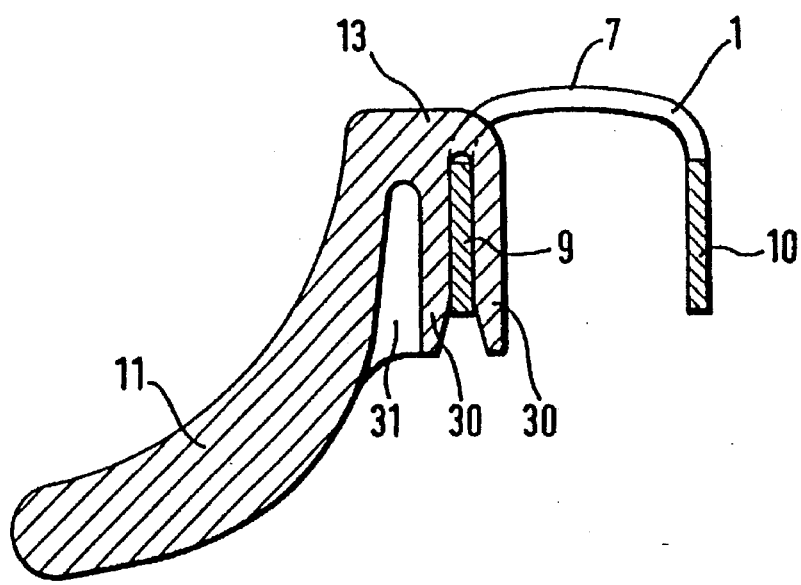
FIG. 6 a cut through the primary bracket and the wind guide device along the line VI—VI in FIG. 2, enlarged.
Figure 8:
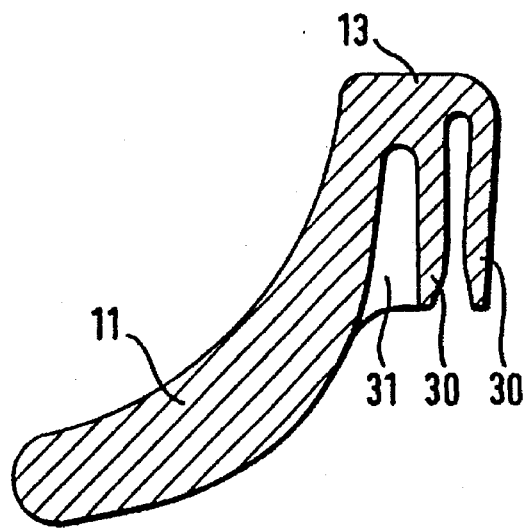
FIG. 8 a cut through the wind guide device in the area of a mounting hook before being mounted on the primary bracket of the wiper.
Figure 9:
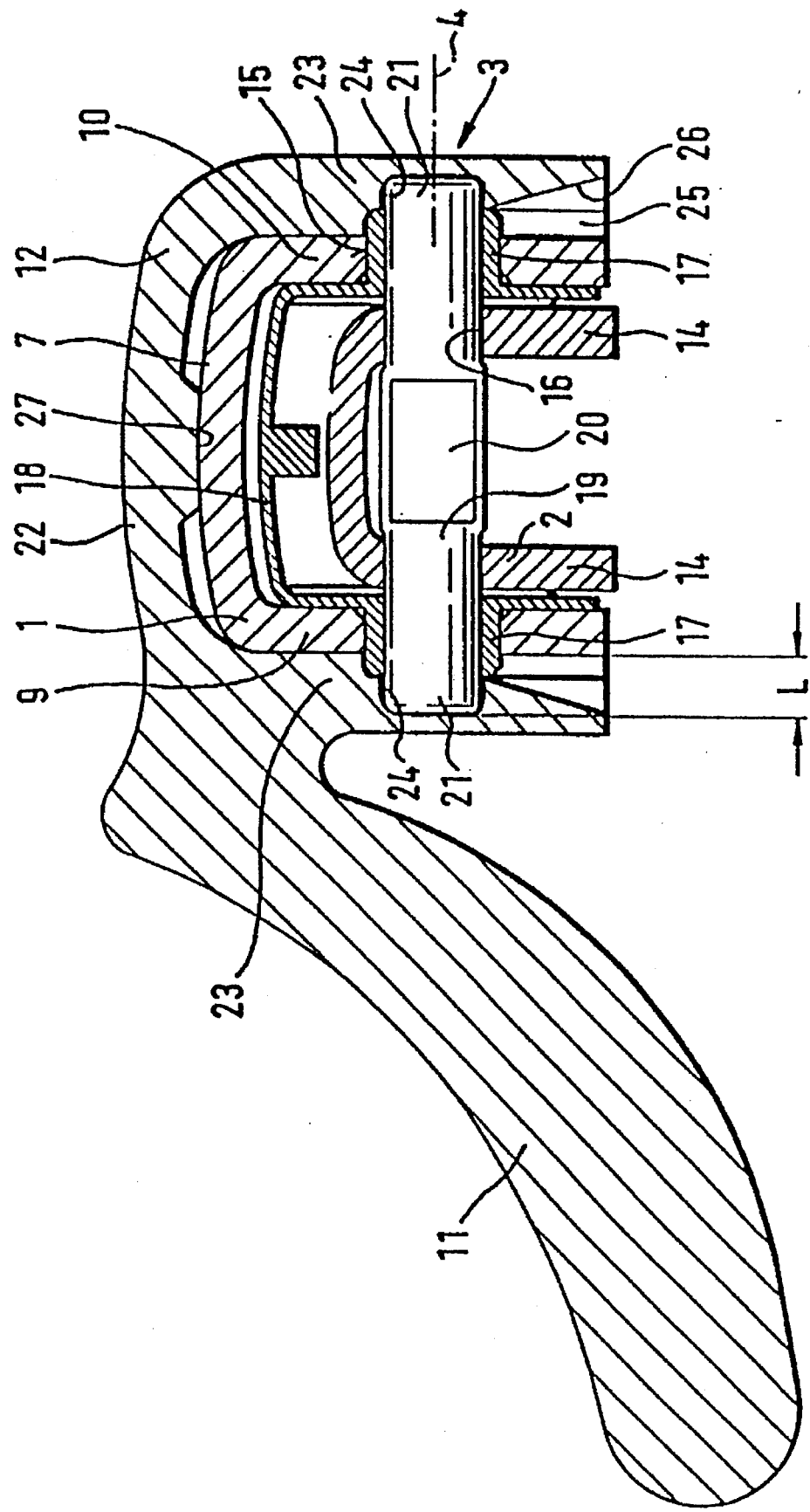
FIG. 9 a cut through the swivel bearing similar to FIG. 3, however, the recesses are shown as blind holes.

In FIG. 6 a cut shows how an additional mounting hook 13, provided on the wind guide device 11, in the area of an opening 8 in the back 7 of the primary bracket 1 is slipped over the front side wall 9 of the primary bracket 1. The mounting hook 13, which is attached in one piece to the wind guide device 11, is also equipped with two side walls 30, which are spaced apart at a distance which corresponds to the thickness of the side wall 9 of the primary bracket 1, and whose upper side is connected by a narrow back. The side wall 30 which faces the wind guide device 11 is supported on the actual wind guide device 11 with a reinforcing rib 31 and therefore in relation to this wind guide device 11, it is designed to be rigid. The side wall 30 of the mounting hook 13 which faces away from the wind guide device 11 may be elastically disengaged in diagonal direction of the wind guide device 11. As shown in FIG. 8, before the wind guide device 11 is mounted on the primary bracket is the side wall 30 of the mounting hook 13 which faces away from the wind guide device 11 is slanted at a slight angle starting from the back to the side wall 30 which faces the wind guide device 11. In addition, run-up bevels, which are directed outward, are provided in the lower part of the side walls 30, which make it easier to slip the mounting hook 13 over the side wall 9 of the primary bracket 1. In order to ensure the largest possible abutment of the side walls 30 on the side wall 9, the side walls 30 project over the lower edge of the primary bracket 1 by at least that part in which the run-up bevels are provided.

Figure 7:
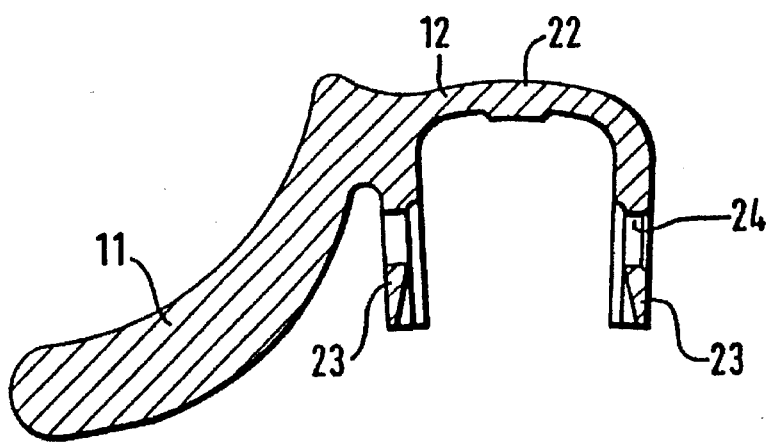
FIG. 7 a cut through the wind guide device in the area of a mounting bracket before being mounted on the primary bracket of the wiper.

Finally, FIG. 7 shows that before the wind guide device is mounted on the primary bracket 1, the side walls 23 of the mounting bracket 12 also run downward toward each other at a very flat angle, starting at its back 22.

We claim:

1. A windshield wiper assembly, said assembly comprising:

an elongated primary bracket for supporting a wiper strip, said primary bracket has opposed ends and is generally U-shaped in transverse cross-section to define a pair of side walls connected by a back wall, said sides walls define inner and outer surfaces, said primary bracket includes a pair of openings at each end;

a subordinate bracket pivotally attached to each end of the primary bracket wherein the primary bracket extends over at least a portion of each subordinate bracket, each subordinate bracket has a pair of openings therein;

a pair of joint pins pivotally couple, respectively, the subordinate brackets to the ends of the primary bracket by extending through the openings in the subordinate and primary brackets, each said pin is axially secured with respect to the brackets and has opposite ends which project outwardly from said outer surface of the primary bracket to define stop bars;

a wind guide device for imparting a wind force to the primary bracket, said wind guide device having support means for engaging the primary bracket, said support means includes at least one mounting bracket, said at least one mounting bracket is flexible and U-shaped in cross-section to define a pair of side walls connected by a back wall, said side walls and back wall of said at least one mounting bracket include inner and outer surfaces, each said inner surface of said side walls of said at least one mounting bracket includes a blind hole therein which defines a recess;

said at least one mounting bracket of said wind guide device is mounted on said primary bracket such that said blind holes receive opposite ends of one of said pins to thereby releasably hold the wind guide device to the primary bracket, the depth of the blind holes is such that the inside surface of the side walls of the mounting bracket abut the outside surface of the side walls of the primary bracket.

2. A windshield wiper assembly according to claim 1, wherein the recesses in the side walls of the at least one mounting bracket are aligned openings.

3. A windshield wiper assembly according to claim 1, wherein the recesses in the side walls of the at least one mounting bracket are which are complimentary to the stop bars.

4. A windshield wiper assembly according to claim 1, wherein the inner surfaces of the side walls of the at least one mounting bracket include insert grooves, said insert grooves extend from a lower edge of the side walls of the at least one mounting bracket to the recesses, the insert grooves define run-up bevels leading to the recesses.

5. A windshield wiper assembly according to claim 1, wherein further including mounting hooks on the wind guide device, said hooks may be slipped from over one of the sidewalls of the primary bracket facing the wind guide device in an area of an opening, that the mounting hooks are formed by two side walls, which are connected on their upper side by a narrow back while a distance between the insides of these side walls are adjusted to a thickness of the corresponding side wall of the primary bracket.

6. A windshield wiper assembly according to claim 5, wherein the side walls of one of the at least mounting bracket and the mounting hooks extend at least to a lower edge of one of the side walls of the primary bracket.

7. A windshield wiper assembly according to claim 5, wherein the wind guide device including mounting brackets and mounting hooks is produced as a single piece plastic part.

8. A windshield wiper assembly, said assembly comprising:

an elongated primary bracket for supporting a wiper strip, said primary bracket has opposed ends and is generally U-shaped in transverse cross-section to define a pair of side walls connected by a back wall, said sides walls define inner and outer surfaces, said primary bracket includes a pair of openings at each end;

a subordinate bracket pivotally attached to each end of the primary bracket wherein the primary bracket extends over at least a portion of each subordinate bracket, each subordinate bracket has a pair of openings therein;

a pair of joint pins pivotally couple, respectively, the subordinate brackets to the ends of the primary bracket by extending through the openings in the subordinate and primary brackets, each said pin is axially secured with respect to the brackets and has opposite ends which project outwardly from said outer surface of the primary bracket to define stop bars;

a wind guide device for imparting a wind force to the primary bracket, the wind guide device having support means for engaging the primary bracket, said support means includes at least one mounting bracket, said at least one mounting bracket is flexible and U-shaped in cross-section to define a pair of side walls connected by a back wall, said side walls and back wall of said at least one mounting bracket include inner and outer surfaces, each said inner surface of said side walls of said at least one mounting bracket includes a recess therein, said inner surface of said back wall of said at least one mounting bracket is provided with a raised support surface; said at least one mounting bracket of said wind guide device is mounted on said primary bracket such that said recesses receive opposite ends of one of said pins to thereby releasably hold the wind guide device to the primary bracket, said raised support surface engages a middle portion of the outer surface of the back wall of the primary bracket so that a remaining part of the outer surface of the back wall of the primary bracket is spaced from the inner surface of the back wall of the at least one mounting bracket.

\* \* \* \* \*